(12) United States Patent
Mahon et al.

(10) Patent No.: US 11,839,871 B2
(45) Date of Patent: Dec. 12, 2023

(54) METHOD AND APPARATUS FOR COATING AN END SURFACE OF A MONOLITHIC SUBSTRATE

(71) Applicant: Johnson Matthey Public Limited Company, London (GB)

(72) Inventors: Kenneth Mahon, Audubon, PA (US); R. Bradford Fortner, Audubon, PA (US); Mario Jaime Castagnola, Audubon, PA (US)

(*) Notice: Subject to any disclaimer, the term of this patent is extended or adjusted under 35 U.S.C. 154(b) by 1133 days.

(21) Appl. No.: 16/615,596

(22) PCT Filed: Feb. 23, 2016

(86) PCT No.: PCT/GB2016/050457
§ 371 (c)(1),
(2) Date: Nov. 21, 2019

(87) PCT Pub. No.: WO2017/118831
PCT Pub. Date: Jul. 13, 2017

(65) Prior Publication Data
US 2020/0156054 A1 May 21, 2020

Related U.S. Application Data

(60) Provisional application No. 62/276,330, filed on Jan. 8, 2016.

(51) Int. Cl.
| | | |
|---|---|---|
| B05D 1/28 | (2006.01) | |
| B01J 37/02 | (2006.01) | |
| B01J 23/56 | (2006.01) | |
| B05B 1/08 | (2006.01) | |
| B05C 1/08 | (2006.01) | |
| B01J 35/04 | (2006.01) | |

(52) U.S. Cl.
CPC .......... B01J 37/0215 (2013.01); B01J 23/56 (2013.01); B01J 35/04 (2013.01); B05B 1/08 (2013.01); B05C 1/08 (2013.01); B05D 1/28 (2013.01)

(58) Field of Classification Search
CPC ........ B01J 37/0215; B01J 23/56; B01J 35/04; B05C 1/08; B05D 1/28
See application file for complete search history.

(56) References Cited

U.S. PATENT DOCUMENTS

| | | | |
|---|---|---|---|
| 3,250,244 A | | 5/1966 | Reinhart |
| 4,381,590 A | | 5/1983 | Nonnenmann et al. |
| 4,550,034 A | * | 10/1985 | Shimrock ............ B01J 37/0215 502/514 |
| 5,466,291 A | | 11/1995 | Dirico |
| 6,425,517 B1 | | 7/2002 | Wieres et al. |

(Continued)

FOREIGN PATENT DOCUMENTS

| | | |
|---|---|---|
| CN | 1289389 A | 3/2001 |
| CN | 106714977 A | 5/2017 |

(Continued)

*Primary Examiner* — William P Fletcher, III (57) ABSTRACT

A method of coating an end surface of a monolithic substrate with a liquid is described and an apparatus therefor. The method comprises: (a) conveying a monolithic substrate to or toward a coating roller; and (b) applying a liquid onto an end surface of the monolithic substrate by contacting the end surface with the coating roller loaded with the liquid.

13 Claims, 1 Drawing Sheet

(56) References Cited

U.S. PATENT DOCUMENTS

| | | | |
|---|---|---|---|
| 6,497,039 B1 * | 12/2002 | Wieres | B01D 53/94 |
| | | | 29/527.1 |
| 7,410,541 B2 | 8/2008 | Boyd et al. | |
| 8,257,659 B2 | 9/2012 | Simon, III et al. | |
| 8,668,891 B2 | 3/2014 | Blakeman et al. | |
| 2015/0053132 A1 | 2/2015 | Huang | |
| 2016/0023237 A1 * | 1/2016 | Gramiccioni | B05C 11/101 |
| | | | 118/712 |

FOREIGN PATENT DOCUMENTS

| | | | |
|---|---|---|---|
| GB | 1021310 | 3/1966 | |
| GB | 1504658 | 3/1978 | |
| GB | 2051624 A | 1/1981 | |
| JP | 0639295 A | 2/1994 | |
| JP | 2002500960 A | 1/2002 | |
| JP | 2002045782 A | 2/2002 | |
| JP | 2013027815 A | 2/2011 | |
| JP | 2011206636 A | 10/2011 | |
| JP | 2012200620 A | 10/2012 | |
| JP | 2015507116 A | 3/2015 | |
| RU | 2386483 C2 | 4/2010 | |
| RU | 2527093 C1 | 8/2014 | |
| WO | 9937896 A1 | 7/1999 | |
| WO | 9947260 A1 | 9/1999 | |
| WO | 2011080525 A1 | 7/2011 | |
| WO | 2014195685 A1 | 12/2014 | |
| WO | WO-2014195685 A1 * | 12/2014 | B01D 53/94 |
| WO | 2015152408 A1 | 10/2015 | |
| WO | 2016014407 A2 | 1/2016 | |

* cited by examiner

METHOD AND APPARATUS FOR COATING AN END SURFACE OF A MONOLITHIC SUBSTRATE

FIELD OF THE INVENTION

The invention relates to a method of coating an end surface of a monolithic substrate for use in an emissions control device. The invention further provides an apparatus for coating an end surface of a monolithic substrate.

BACKGROUND TO THE INVENTION

Large numbers of emissions control devices comprising coated monolithic substrates are manufactured each year. One of the principal uses of such devices is for the treatment of exhaust gases, such as the exhaust gases produced by a power plant or by an internal combustion engine, particularly a vehicular internal combustion engine. The monolithic substrate contains a plurality of channels that bring the exhaust gas into contact with a coating on the channel walls within the substrate. This coating may trap, oxidise and/or reduce constituents of the exhaust gas that are hazardous to human health or that are environmentally unfriendly. The monolithic substrate may also be a filter substrate, which can remove soot (i.e. particulate matter), such as the soot produced by internal combustion engines.

Environmental legislation restricting the levels of pollutants that can be emitted into the atmosphere in an exhaust gas is becoming increasingly strict. There is a need to provide emissions control devices having improved or modified activity in order to meet these legislative requirements. One such approach is to apply a coating, particularly a catalytic coating, on an end surface of the monolithic substrate.

U.S. Pat. No. 8,257,659 B2 describes an emissions control device having an inlet end surface or face of the honeycomb substrate with a catalytic coating for reducing or preventing the channel openings from becoming blocked with soot (so-called face-plugging).

UK Patent Application No. 1504658.4 by the present Applicant describes an emissions control device having an outlet end surface coated with a capture material for trapping platinum that becomes volatilised when the device is exposed to high temperatures.

There is a need for an automated method for accurately coating only an end surface of a monolithic substrate.

SUMMARY OF THE INVENTION

The inventors have developed a method and apparatus that allows the automated and uniform coating of an end surface of a monolithic substrate with a liquid. The invention also allows the amount of liquid coated onto a monolithic substrate, particularly platinum group metal salts present in the liquid, to be accurately controlled thereby avoiding wastage.

The invention provides a method, preferably an automated method, of coating an end surface of a monolithic substrate with a liquid. The method comprises:
  (a) conveying a monolithic substrate to or toward a coating roller; and
  (b) applying a liquid onto an end surface of the monolithic substrate by contacting the end surface with the coating roller loaded with the liquid.

The invention further provides an apparatus, preferably an automated apparatus, for coating an end surface of a monolithic substrate with a liquid. The apparatus comprises:
  (a) a conveying device for the monolithic substrate;
  (b) a coating roller for applying a liquid onto the end surface of the monolithic substrate; and
  (c) a liquid applicator; wherein the conveying device is arranged to convey the monolithic substrate to or toward the coating roller, and the liquid applicator is arranged to load the coating roller with a liquid.

The apparatus is for performing the method of the invention. Thus, the invention relates to the use of the apparatus for performing the method.

Methods in the prior art for coating a monolithic substrate with a liquid, particularly a washcoat, are focused on coating the internal walls of the channels within the substrate. They do not provide a practical method for the controlled and uniform application of a liquid to only an end surface of the substrate.

BRIEF DESCRIPTION OF THE DRAWINGS

The FIGURE shows a cross-section of an apparatus in accordance of the invention. A coating roller (1) rotates within a trough (5) containing the liquid (2) for application to an end surface of a monolithic substrate (10). The monolithic substrate is shown on a conveying device, which is a roller conveyor that comprises a plurality of rollers (4). The apparatus also comprises a second conveying device, which is a roller conveyor comprising a plurality of rollers (6).

DETAILED DESCRIPTION OF THE INVENTION

Figure 1:
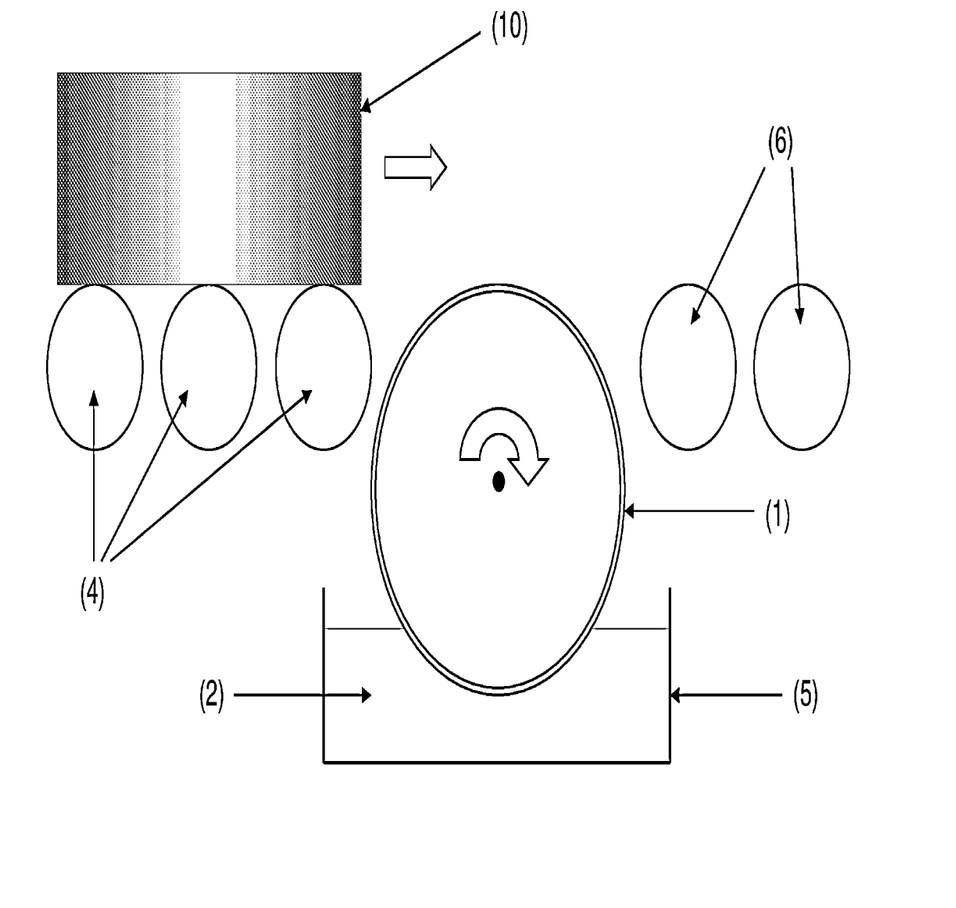

The invention relates to a method of coating an end surface or face of a monolithic substrate with a liquid and to an apparatus therefor. The method of the invention, and the apparatus therefor, is for coating substantially only an end surface or face of a monolithic substrate with a liquid. Advantageously, the invention facilitates the coating of an end surface without significant ingress of the liquid into the monolithic substrate. It is difficult to automatedly coat substantially only an end surface of a monolithic substrate without inadvertently applying a coating to the channels within the monolithic substrate.

For some liquids it may be difficult to prevent all of the liquid from entering the channels of the monolithic substrate. In such circumstances, the invention allows the obtainment of an even coating depth across all of the channels (i.e. all of the channels having an open end at the end surface that is coated) and a uniform coating distribution within each channel.

In principle, the invention may be used to coat an end surface of any type of monolithic substrate. The monolithic substrate is preferably a monolithic honeycomb substrate.

The monolithic substrate may have a conventional circular cross-section, or it may have an elliptical, oval, "racetrack" or other asymmetric cross-section.

The monolithic substrate has a plurality of channels, typically extending therethrough.

The monolithic substrate may be a filter substrate or a flow-through substrate (i.e. a monolithic filter substrate or a monolithic flow-through substrate).

A flow-through substrate generally comprises a plurality of channels, typically extending therethrough, wherein each channel is open at both ends (i.e. an open end at the inlet and an open end at the outlet). The channels are formed between a plurality of walls. The walls may comprise a non-porous material or a porous material, preferably the walls comprise a non-porous material.

A filter substrate has a different structure to a flow-through substrate. By contrast, a filter substrate comprises a plurality of channels, wherein each channel has an open end and a closed end (e.g. a blocked or plugged end). Each channel is typically separated from an adjacent or neighbouring channel by a wall. The wall comprises, or consists essentially of, a porous material. Such porous materials are well known in the art.

In general, a filter substrate comprises a plurality of inlet channels and a plurality of outlet channels. Each inlet channel has an open end at a first end of the substrate and a closed (e.g. blocked or plugged) end at a second end of the substrate (i.e. the second end is the opposite end to the first end), and each outlet channel has a closed (e.g. blocked or plugged) end at the first end of the substrate and an open end at the second end of the substrate.

In a filter substrate, each channel having an open end at a first end of the substrate and a closed end at a second (i.e. opposite) end of the substrate is typically adjacent to a channel having a closed end at the first end of the substrate and an open end at the second (i.e. opposite) end of the substrate. Fluid communication between the channels is via a wall (e.g. through the porous material) of the substrate.

Typically, the channels of a filter substrate have alternately closed (e.g. blocked or plugged) and open ends. Thus, each inlet channel may be adjacent to an outlet channel, and each outlet channel may be adjacent to an inlet channel. When viewed from either end of the filter substrate, the channels may have the appearance of a chessboard.

Generally, it is preferred that the monolithic substrate is a flow-through substrate.

The monolithic substrate is typically made or composed of a ceramic material or a metallic material. It is preferred that the substrate is made or composed of aluminium titanate, cordierite ($SiO_2$—$Al_2O_3$—$MgO$), silicon carbide (SiC), Fe—Cr—Al alloy, Ni—Cr—Al alloy, or a stainless steel alloy.

The monolithic substrate may comprise a catalytic material dispersed within the substrate (e.g. dispersed within the body of the substrate). The catalytic material (or a precursor therefor) is part of an extrudate that is used to form the monolithic substrate. Thus, the monolithic substrate may be an extruded solid body, wherein the solid body comprises a catalytic material.

The liquid may be a solution or a suspension. The suspension may be a colloidal suspension, such as a sol, or a non-colloidal suspension. When the liquid is a solution or a suspension, then it may be an aqueous solution or an aqueous suspension.

It is preferred that the liquid is a solution, more preferably an aqueous solution.

In general, the liquid is adherent.

Typically, the liquid comprises a catalyst component. The expression "catalyst component" encompasses any component that may be included in a coating that contributes to the activity of the resulting emissions control device or a precursor therefor. The catalytic component may, for example, be (i) a platinum group metal (PGM) or an oxide of the PGM (or a precursor, such as a salt of the PGM), (ii) a transition metal or an oxide of the transition metal (or a precursor, such as a salt of the transition metal), (iii) a support material (e.g. refractory oxide), (iv) a $NO_x$ storage component, such as an alkali metal, alkaline earth metal or an oxide or carbonate thereof, and/or (v) a zeolite. It is to be understood that the term "catalyst component" does not require that the component itself has catalytic activity in the strict sense of the meaning of the term "catalyst" (e.g. kinetically increasing the rate of reaction). For example, the catalyst component can refer to a material that is able to store or absorb $NO_x$ or a hydrocarbon. Liquids comprising a catalyst component are known to those skilled in the art. The catalyst component(s) included in the liquid will depend on the product that is to be manufactured.

The product obtained by a method of the invention or by using an apparatus of the invention may, for example, be a three way catalyst (TWC), a gasoline particulate filter (GPF), a diesel oxidation catalyst (DOC), a catalysed soot filter (CSF), a lean $NO_x$ trap (LNT), a passive $NO_x$ adsorber (PNA), a selective catalytic reduction (SCR) catalyst, selective catalytic reduction filter catalyst (SCRF™), an ammonia slip catalyst (ASC), a cold start catalyst (dCSC™), a urea hydrolysis catalyst (UHC) or a combination of two or more thereof.

In addition to the "catalyst component", the liquid may further comprise a formulation aid. The term "formulation aid" refers to a component that is included in the liquid to modify its chemical or physical properties for coating onto a monolithic substrate. The formulation aid may, for example, aid the dispersion of a catalytic component in the liquid or change the viscosity of the liquid. The formulation aid may not be present in the final coated monolithic substrate product (e.g. it may decompose or degrade during calcination). The formulation aid may, for example, be an acid, a base, a thickener (e.g. organic compound thickener) or a binder. Examples of such formulation aids are known in the art.

In general, the liquid may comprise a thickener. The thickener may be included to provide the liquid with a viscosity to allow it to adhere to an end surface of the monolithic substrate and/or to reduce or prevent the liquid from entering the channels of the monolithic substrate.

The term "liquid" as used herein may embrace the term "washcoat". In general, a washcoat comprises a zeolite or a support material, such as a refractory oxide.

It is preferred that the liquid comprises a salt of a PGM or a salt of a transition metal, preferably a salt of PGM, especially when the liquid is a solution, such as an aqueous solution. More preferably, the liquid is not a washcoat. Thus, the liquid does not comprise a zeolite or a support material, such as a refractory oxide.

The liquid may be an impregnation solution, particularly when the liquid does not comprise a zeolite or a support material, such as a refractory oxide. When the liquid is an impregnation solution, then preferably the impregnation solution comprises a platinum group metal, such as a platinum group metal selected from the group consisting of platinum, palladium, rhodium and a combination of two or more thereof.

The monolithic substrate for use in the invention may be a coated monolithic substrate or an uncoated monolithic substrate. It is preferred that the monolithic substrate is a coated monolithic substrate (i.e. the monolithic substrate is pre-coated). The monolithic substrate may be pre-coated using any suitable method in the prior art, such as the Applicant's WO 99/47260, WO 2011/080525 and WO 2014/195685.

The coated monolithic substrate (e.g. pre-coated monolithic substrate) typically comprises a coating within the plurality of channels. The coating may be disposed on and/or within the plurality of walls.

When the coated monolithic substrate is a flow-through substrate, then typically the coating is preferably disposed on the plurality of walls. When the coated monolithic substrate is a coated filter substrate, then the coating is within the plurality of inlet channels and/or within the plurality of outlet channels.

Typically, the coating (i.e. of the coated monolithic substrate [e.g. the pre-coated monolithic substrate]) has a different composition to the coating on an end surface of the monolithic substrate obtained by the method of the invention or by using the apparatus of the invention.

The invention may provide a method and/or apparatus for concurrently coating a plurality of end surfaces or faces of a plurality of monolithic substrates with a liquid. Thus, an end face of each of several monolithic substrates can be simultaneously coated with the liquid. The method of the invention is preferably for coating substantially only a plurality of end surfaces or faces of a plurality of a monolithic substrate with a liquid.

In general, the coating roller has a longitudinal axis and the coating roller rotates (e.g. when in use, such as in the method of the invention) or is rotatable about the longitudinal axis. It is preferred that the coating roller is cylindrical and either rotates (e.g. when in use, such as in the method of the invention) or is rotatable about its longitudinal (i.e. cylindrical) axis. The coating roller is preferably right circular cylindrical.

The coating roller is preferably motor-driven.

Generally, the coating roller comprises a side surface. The side surface moves (e.g. when in use, such as in the method of the invention) or is moveable. A point on the side surface rotates (e.g. when in use) or is rotatable about the longitudinal axis of the coating roller.

The side surface of the coating roller is referred to herein as the "coater surface". The coater surface is typically a curved side surface. When the coating roller is cylindrical (e.g. is a cylinder), particularly right circular cylindrical, then the coater surface is the side surface of a cylinder (i.e. not the circular ends or end surfaces of the cylinder).

The method of the invention includes (a) conveying a monolithic substrate to or toward a coating roller, such as by using a conveying device for the monolithic substrate (i.e. the conveying device of the apparatus of the invention).

It is preferred that step (a) of the method comprises (a) conveying a monolithic substrate to or toward a coating roller to bring an end surface of the monolithic substrate into contact with the coating roller, preferably into contact with a coater surface of the coating roller, such as a coating roller as defined herein. More preferably step (a) comprises (a) conveying a monolithic substrate to or toward a coating roller to bring an end surface of the monolithic substrate into contact with a coater surface of the coating roller.

Generally, step (a) of the method of the invention comprises (a) conveying a monolithic substrate in an orientation to or toward a coating roller where (i) an end surface [i.e. an end surface plane or the plane containing the end surface] of the monolithic substrate is substantially parallel to the longitudinal (i.e. cylindrical) axis of the coating roller, and/or (ii) a plurality of channels of the monolithic substrate (e.g. the channels extending therethrough) are substantially perpendicular to the longitudinal (i.e. cylindrical) axis of the coating roller. The end surface is preferably the end surface to be coated. When the end surface has an orientation as defined in (i) and/or (ii), then the monolithic substrate is correctly oriented for a liquid to be applied to the end surface using the coating roller.

Step (a) of the method of the invention typically comprises (a) conveying a monolithic substrate in a direction to or toward a coating roller, wherein the direction is tangential to the coating roller (i.e. tangential to the circular cross section of the coating roller). It is preferred that step (a) comprises (a) conveying a monolithic substrate in a direction and an orientation to or toward a coating roller, wherein the direction is tangential to the coating roller (i.e. tangential to the circular cross section of the coating roller) and wherein (i) an end surface [i.e. an end surface plane or the plane containing the end surface] of the monolithic substrate is substantially parallel to the longitudinal (i.e. cylindrical) axis of the coating roller, and/or (ii) a plurality of channels of the monolithic substrate (e.g. the channels extending therethrough) are substantially perpendicular to the longitudinal (i.e. cylindrical) axis of the coating roller.

Typically, the longitudinal (i.e. cylindrical) axis of the coating roller is substantially horizontal or substantially vertical (e.g. to the ground). It is preferred that the longitudinal (i.e. cylindrical) axis of the coating roller is substantially horizontal (e.g. to the ground).

The end surface [i.e. an end surface plane or the plane containing the end surface] of the monolithic substrate may be substantially parallel to the longitudinal (i.e. cylindrical) axis of the coating roller. When the longitudinal axis of the coating roller is substantially horizontal (e.g. to the ground), then the end surface of the monolithic substrate may be substantially horizontal (e.g. to the ground). When the longitudinal axis of the coating roller is substantially vertical (e.g. to the ground), then the end surface of the monolithic substrate may be substantially vertical (e.g. to the ground). It is preferred that the end surface of the monolithic substrate is substantially horizontal.

The plurality of channels of the monolithic substrate (e.g. the channels extending therethrough) may be substantially perpendicular to the longitudinal (i.e. cylindrical) axis of the coating roller. When the longitudinal (i.e. cylindrical) axis of the coating roller is substantially horizontal (e.g. to the ground), then the plurality of channels of the monolithic substrate (e.g. the channels extending therethrough) may be substantially vertical (e.g. to the ground). When the longitudinal (i.e. cylindrical) axis of the coating roller is substantially vertical (e.g. to the ground), then the plurality of channels of the monolithic substrate (e.g. the channels extending therethrough) may be substantially horizontal (e.g. to the ground). It is preferred that the plurality of channels of the monolithic substrate is substantially vertical.

It is particularly advantageous when the end surface of the monolithic substrate is substantially horizontal and/or the plurality of channels of the monolithic substrate is substantially vertical. In such an arrangement, the monolithic substrate is upright and gravity assists in reducing and/or preventing the ingress of the liquid from the coating roller into the channels of the monolithic substrate. Thus, substantially only an end surface or face of the monolithic substrate is coated with the liquid.

When the longitudinal (i.e. cylindrical) axis of the coating roller is substantially horizontal (e.g. to the ground), it is preferred that the monolithic substrate, preferably an end surface of the monolithic substrate, passes over the coating roller. Thus, the monolithic substrate is brought into contact with and passes over the coater surface of the coating roller. In this arrangement, a lower end surface of the monolithic substrate is coated with the liquid.

Typically, the position of the longitudinal axis of the coating roller is fixed in relation to the position of the conveying device, particularly when in use.

In the method of the invention, step (b) may comprise (b) applying a liquid onto an end surface of the monolithic substrate by contacting the end surface with the coating roller loaded with the liquid and passing the monolithic substrate over the coating roller.

In the apparatus of the invention, the conveying device is upstream of the coating roller.

The coating roller may be located to allow a monolithic substrate (e.g. an end surface of the monolithic substrate) from the conveying device to pass over, preferably to be brought into contact with and pass over, the coater surface (i.e. of the coating roller).

In principle, the conveying device may be any automated device for transporting a monolithic substrate to the coating roller, preferably for transporting a monolithic substrate having an end surface oriented for coating with the coating roller. The conveying device should not cause breakage or damage to the monolithic substrate.

The conveying device may, for example, be a roller conveyor, belt conveyor, wire mesh conveyor, a chain conveyor or a robotic arm.

When the conveying device is a roller conveyor, then preferably the conveying device comprises a plurality of rollers, preferably a plurality of rollers arranged in series. Each roller of the plurality of rollers is typically cylindrical. Each roller of the plurality of rollers has a longitudinal (i.e. cylindrical) axis. It is preferred that the diameter of each roller of the plurality of rollers is the same.

The plurality of rollers provides a series of surfaces for supporting and conveying a monolithic substrate to the coating roller. Each roller of the plurality of rollers has a surface for supporting and conveying a monolithic substrate to the coating roller.

When in use, it is preferred that the tangential speed of each surface of each roller of the plurality of rollers is the same. The plurality of rollers may be motor-driven, preferably motor-driven such that the tangential speed of each surface of each roller of the plurality of rollers is the same.

Typically, the plurality of rollers comprises a roller adjacent (e.g. directly adjacent) to the coating roller. The roller adjacent to the coating roller preferably has a longitudinal (i.e. cylindrical) axis substantially parallel to the longitudinal (i.e. cylindrical) axis of the coating roller.

When the conveying device is a belt conveyor, then preferably the conveying device comprises a belt. The belt provides a surface for supporting and conveying a monolithic substrate to the coating roller. The belt is preferably motor-driven.

When the conveying device is a wire mesh conveyor, then preferably the conveying device comprises a wire mesh. The conveying device may comprise a single wire mesh sheet or a plurality of wire mesh segments. The single wire mesh sheet or the plurality of wire mesh segments provides a surface (or a series of surfaces) for supporting and conveying a monolithic substrate to the coating roller. The single wire mesh sheet or the plurality of wire mesh segments is preferably motor-driven.

When the conveying device is a chain conveyor, then preferably the conveying device comprises a chain. The conveying device may comprise a plurality of chains. The chain or the plurality of chains provide a surface (or a series of surfaces) for supporting and conveying a monolithic substrate to the coating roller. The chain or plurality of chains is preferably motor-driven.

The method of the invention comprises the step of (b) applying a liquid onto an end surface of the monolithic substrate by contacting the end surface with the coating roller loaded with the liquid. This step typically comprises (b) applying a liquid onto substantially only an end surface of the monolithic substrate by contacting the end surface with the coating roller loaded with the liquid.

When the coating roller is loaded with the liquid, then the coater surface is loaded with, or carries, the liquid.

In the method of the invention, step (b) preferably comprises (b) applying a liquid onto (e.g. substantially only) an end surface of the monolithic substrate by contacting the end surface with a coater surface of the coating roller. The coating roller is preferably loaded with the liquid.

The coating roller may have a sleeve (e.g. roller cover) comprising the coater surface. The sleeve may be replaceable. Alternatively, the coater surface may be an integral part of the coating roller.

The coater surface of the coating roller may be an absorbent surface (e.g. for absorbing the liquid) or a non-absorbent surface.

The coater surface may comprise, or consist essentially of, a foam material (i.e. a solid foam material). Thus, the coater surface of the coating roller may comprise, or consist essentially of, a foam material.

It is preferred that the coater surface of the coating roller is a non-absorbent surface. This is to ensure complete transfer of the liquid from the coater surface to an end surface of the monolithic substrate. When residual liquid remains on the coater surface, an uneven concentration of the components within the liquid can be applied to the monolithic substrate or reintroduced into, for example, a trough containing the liquid.

The foam material is typically a closed-cell foam material (e.g. when the coater surface of the coating roller is a non-absorbent surface).

It is preferable that the foam material is an elastomeric foam material or a silicone foam material. More preferably, the foam material is an elastomeric foam material, still more preferably a closed-cell, elastomeric foam material.

The foam material is preferably an ethylene propylene diene monomer (EPDM) rubber material.

The surface (i.e. of the coating roller), such as an absorbent surface, is typically suitable for releasing the liquid (e.g. the loaded liquid) onto an end surface of the monolithic substrate when contact pressure is applied between the surface and the end surface. The contact pressure may be applied through the weight of the monolithic substrate acting on the coating roller. Alternatively, the coating roller may be pressed against (i.e. pushed towards) the monolithic substrate and/or the monolithic substrate may be pressed against the coating roller. It is preferred that the contact pressure is applied through the weight of the monolithic substrate acting on the coating roller.

The method of the invention comprises the step of (b) applying a liquid onto an end surface (e.g. substantially only an end surface) of the monolithic substrate by contacting the end surface with an absorbent surface of the coating roller, wherein the absorbent surface is loaded with the liquid and releases the liquid onto the end surface of the monolithic substrate when contact pressure is applied between the absorbent surface and the end surface.

As mentioned above, the longitudinal (e.g. cylindrical) axis of the coating roller may be substantially vertical or substantially horizontal (i.e. to the ground). It is preferred that the longitudinal axis of the coating roller is substantially horizontal.

When the longitudinal axis of the coating roller is substantially horizontal, then contact pressure may be applied between the absorbent surface and the end surface of the monolithic substrate when the monolithic substrate passes over the coating roller. The weight of the monolithic substrate on the coating roller provides the contact pressure that is applied between the absorbent surface and the end surface of the monolithic substrate.

Generally, step (b) comprises contacting the end surface with the coating roller loaded with the liquid, and rolling or rotating the coating roller over the end surface.

In principle, any type of liquid applicator may be used to load the coating roller. The liquid applicator is typically suitable for evenly loading the liquid onto a coater surface.

The liquid applicator may pour or spray the liquid onto the coater surface. For example, the liquid applicator may comprise a nozzle, which is arranged to apply or coat the coater surface with the liquid.

Additionally or alternatively, the liquid applicator may comprise a trough. The trough is suitable for containing the liquid. Typically, the trough has a volume that is defined by at least one wall for containing the liquid. When the liquid applicator pours or sprays the liquid onto the coater surface, the trough may be arranged to catch excess liquid that may drip from the coater surface.

Typically, the position of the longitudinal axis of the coating roller is fixed in relation to the position of the trough, particularly when in use.

When the longitudinal (e.g. cylindrical) axis of the coating roller is substantially horizontal (i.e. to the ground), it is preferred that the trough is located below or underneath the coating roller.

In general, the trough may be arranged to load the liquid onto the coating roller (e.g. to load the liquid directly onto the coating roller). It is preferred that the trough is arranged to load the liquid onto the coater surface (e.g. directly onto the coater surface).

When the trough is arranged to load the liquid onto the coating roller or the coater surface, then preferably the trough is located below or underneath the coating roller. It is preferred that the trough and the coating roller are arranged to allow the coater surface to come into contact with and/or to become immersed in the liquid (e.g. when the trough contains the liquid). More preferably, the trough and the coating roller are arranged to allow an underside of the coater surface of the coating roller to come into contact with and/or to become immersed in the liquid.

If the coater surface of the coating roller is an absorbent surface (e.g. for absorbing the liquid), then liquid may be loaded onto the coater surface when the coater surface absorbs liquid from within the trough.

Alternatively, the liquid applicator may further comprise a pick-up roller. The trough is located below or underneath the pick-up roller. It is preferred that the trough and the pick-up roller are arranged to allow a part of the surface of the pick-up roller to come into contact with and/or to become immersed in the liquid (e.g. when the trough contains the liquid). More preferably, the trough and the pick-up roller are arranged to allow an underside of the surface (i.e. the part of the surface) of the pick-up roller to come into contact with and/or to become immersed in the liquid.

When the liquid applicator comprises a pick-up roller, then preferably the coating roller is arranged to contact a surface of the pick-up roller. More preferably, the coater surface of the coating roller is arranged to contact a surface, particularly an upper side surface, of the pick-up roller. During use, the liquid is typically transferred from a surface of the pick-up roller to the coater surface of the coating roller.

In general, the liquid applicator may further comprise a liquid dispenser. It is preferred that the trough is coupled to a liquid dispenser, preferably wherein the liquid dispenser is able to dispense the liquid into the trough through a valve in the wall of the trough. The liquid dispenser may be engineered using generally known principles. For example, there are commercially available machines capable of highly accurate dosing by volume or weight of liquids, for example used for filling in the food or paint industry. These machines are capable of handling liquids of many different viscosities and rheologies.

Step (b) of the method of the invention produces a monolithic substrate having an end surface coated with the liquid. The method of the invention may further comprise the step of (c) drying the monolithic substrate having an end surface coated with the liquid, preferably to dry the liquid onto the monolithic substrate.

Step (c) may comprise (c1) drying the monolithic substrate having an end surface coated with the liquid, preferably to dry the liquid onto the monolithic substrate, and then (c2) calcining the monolithic substrate.

Generally, step (c) follows step (b). Thus, steps (c1) and (c2) follow step (b).

The monolithic substrate may be dried at 75 to 125° C. (e.g. for 5 to 60 minutes, particularly for 10 to 30 minutes. The drying step may be performed to fix the liquid onto the monolithic substrate.

The monolithic substrate may be calcined at a temperature up to 550° C., such as 125 to 550° C. (e.g. greater than 125° C. and up to 550° C.).

Step (c) of the method of the invention may comprise (c0) conveying the monolithic having an end surface coated with the liquid away from a coating roller (e.g. using a second conveying device). More preferably, step (c) comprises (c0) conveying the monolithic having an end surface coated with the liquid away from a coating roller (e.g. using a second conveying device) and to or toward a device for drying the monolithic substrate having an end surface coated with the liquid and/or a device for calcining the monolithic substrate having an end surface coated with the liquid, such as the device(s) described below.

In general, step (c0) precedes step (c1) and/or step (c2).

Depending on the formulation of the liquid, it may or may not be necessary to invert the monolithic substrate to switch the end surface coated with the liquid from being a lower end surface to being an upper end surface before drying or calcining the monolithic substrate having an end surface coated with the liquid, Step (c) of the method may comprise (c0) conveying the monolithic having an end surface coated with the liquid away from a coating roller (e.g. using a second conveying device) and inverting the monolithic substrate (e.g. rotating the monolithic substrate through 180°). After inverting the monolithic substrate, the end surface coated with the liquid will be at an upper end of the monolithic substrate.

Alternatively, step (c) of the method may comprise (c0) conveying the monolithic having an end surface coated with the liquid away from a coating roller (e.g. using a second conveying device) without inverting the monolithic substrate.

The apparatus of the invention may further comprise (d) a second conveying device for the monolithic substrate having an end surface coated with the liquid. The second conveying device is preferably arranged to convey a monolithic substrate having an end surface coated with the liquid away from the coating roller.

The second conveying device may be any automated device for transporting a monolithic substrate (e.g. having an end surface coated with the liquid) away from the coating roller. The second conveying device should not cause breakage or damage to the monolithic substrate.

The second conveying device is preferably downstream of the coating roller.

The second conveying device may, for example, be a roller conveyor, belt conveyor, wire mesh conveyor, a chain conveyor or a robotic arm, such as described above in relation to "the conveying device".

It is preferred that the second conveying device is a roller conveyor. Preferably the second conveying device comprises a plurality of rollers, preferably a plurality of rollers arranged in series. Each roller of the plurality of rollers is typically cylindrical. Each roller of the plurality of rollers has a longitudinal (i.e. cylindrical) axis. It is preferred that the diameter of each roller of the plurality of rollers is the same.

The plurality of rollers provides a series of surfaces for supporting and conveying a monolithic substrate to the coating roller. Each roller of the plurality of rollers has a surface for supporting and conveying a monolithic substrate to the coating roller.

When in use, it is preferred that the tangential speed of each surface of each roller of the plurality of rollers is the same. The plurality of rollers may be motor-driven, preferably motor-driven such that the tangential speed of each surface of each roller of the plurality of rollers is the same.

Typically, the plurality of rollers comprises a roller adjacent (e.g. directly adjacent) to the coating roller. The roller adjacent to the coating roller preferably has a longitudinal (i.e. cylindrical) axis substantially parallel to the longitudinal (i.e. cylindrical) axis of the coating roller.

It is preferred that the second conveying device is arranged to convey a monolithic substrate having an end surface coated with the liquid (i) away from the coating roller and (ii) to or toward a device for drying the monolithic substrate having an end surface coated with the liquid and/or a device for calcining the monolithic substrate having an end surface coated with the liquid, such as the device(s) described below.

The second conveying device may further comprise a device for inverting the monolithic substrate. The device may, for example, be a robotic arm.

The apparatus of the invention may further comprise (e) a device for drying and/or calcining the monolithic substrate having an end surface coated with the liquid. The device for drying and/or calcining the monolithic substrate is downstream of the coating roller.

The apparatus may comprise (e)(i) a device for drying the monolithic substrate having an end surface coated with the liquid and (ii) a device for calcining the monolithic substrate having an end surface coated with the liquid. Thus, the device for drying the monolithic substrate may be a separate to (e.g. a different device to) the device for calcining the monolithic substrate.

Alternatively, the device for drying and calcining the monolithic substrate having an end surface coated with the liquid may be a single device.

Typically, the device for drying and/or calcining the monolithic substrate having an end surface coated with the liquid is an oven, a hot air gun or a microwave drying apparatus. It is preferred that the device for drying and calcining the monolithic substrate having an end surface coated with the liquid is an oven The invention may involve the use of a plurality of coating rollers.

Thus, the method may comprise:
(a) conveying a monolithic substrate to or toward a plurality of coating rollers; and
(b) applying a liquid onto an end surface of the monolithic substrate by contacting the end surface with the plurality of coating rollers, wherein each coating roller is loaded with the liquid.

The apparatus may comprise:
(a) a conveying device for the monolithic substrate; and
(b) a plurality of coating rollers for applying a liquid onto the end surface of the monolithic substrate; and
(c) a liquid applicator;
wherein the conveying device is arranged to convey the monolithic substrate to or toward the plurality of coating rollers, and the liquid applicator is arranged to load the plurality of coating rollers with the liquid.

Each coating roller of the plurality of coating rollers may have any of the features of the coating roller described in the singular hereinabove.

The plurality of coating rollers is preferably arranged in series. Each coating roller of the plurality of coating rollers is typically cylindrical. Each coating roller of the plurality of coating rollers has a longitudinal (i.e. cylindrical) axis. It is preferred that the diameter of each coating roller of the plurality of coating rollers is the same.

The plurality of coating rollers provides a series of coater surfaces for coating an end surface of the monolithic substrate. Each coating roller of the plurality of coating rollers has a coater surface for coating an end surface of the monolithic substrate.

When in use, it is preferred that the tangential speed (e.g. the speed of each coater surface) of each coating roller of the plurality of coating rollers is the same. The plurality of coating rollers may be motor-driven, preferably motor-driven such that the tangential speed of each coating roller of the plurality of coating rollers is the same.

The liquid applicator is typically suitable for evenly loading the liquid onto the coater surfaces (i.e. of the plurality of coating rollers).

When the liquid applicator pours or sprays the liquid onto the coater surfaces, the trough may be arranged to catch excess liquid that may drip from the coater surfaces.

Additionally or alternatively, the trough may be located below or underneath at least one of the coating rollers of the plurality of coating rollers, more preferably the trough is located below or underneath the plurality of coating rollers (e.g. all of the coating rollers of the plurality of coating rollers).

The trough may be arranged to load the liquid onto the coating rollers or the coater surfaces. The trough is preferably located below or underneath the coating rollers. It is preferred that the trough and the coating rollers are arranged to allow the coater surfaces to come into contact with and/or to become immersed in the liquid (e.g. when the trough contains the liquid). More preferably, the trough and the coating rollers are arranged to allow an underside of each coater' surface to come into contact with and/or to become immersed in the liquid.

Generally, it is preferred that the invention relates to the use of a single coating roller.

Definitions

The term "end surface" as used herein in relation to the monolithic substrate is synonymous with the term "face" of the monolithic substrate. The end surface of a monolithic substrate will provide an inlet or an outlet end of an emissions control device after installation.

Reference is made herein to the "longitudinal axis" of the coating roller. The longitudinal axis passes through the end surfaces of the monolithic substrate. Typically, the longitudinal axis is perpendicular to the plane containing each end surface.

The term "substantially only" as used herein, particularly with reference to the coating of an end face of the monolithic substrate or to applying a liquid onto an end surface of the monolith substrate, refers to a monolithic substrate where the mean length of the liquid or coating (e.g. the liquid applied to, or the coating on, an end surface of the monolithic substrate) in the plurality of channels as measured from the end surface is 5 mm, preferably 3 mm, particularly 2 mm, and more preferably 1 mm. Even more preferably, there is no liquid or coating in the plurality of channels from the end surface (e.g. within experimental measurement error). The term "substantially only" therefore encompasses the term "only". When the monolithic substrate is a filter substrate, the mean length of the liquid or coating in the plurality of channels as measured from the end surface relates to (e.g. only relates to) the plurality of channels having an open end at the end surface. The presence or absence of a coating in the channels of a monolithic substrate (i.e. the extent to which the liquid has entered the channels) can be determined using conventional techniques known in the art, such as X-ray imaging (without damaging the monolithic substrate) or by using an optical microscope (after cutting open the monolithic substrate).

The term "substantially vertically" as used herein with reference to a feature, such as a longitudinal axis (e.g. of a roller, such as the coating roller or of the conveying device), an end surface of a monolithic substrate or the plurality of channels of the monolithic substrate, refers to an arrangement where the feature is ±5° from the vertical, preferably ±3° from the vertical, such as ±0° from the vertical (i.e. perfectly vertical within measurement error). The term "substantially vertically" therefore encompasses the term "vertically".

The term "substantially horizontally" as used herein with reference to a feature, particularly a longitudinal axis (e.g. of a roller, such as the coating roller or of the conveying device), an end surface of a monolithic substrate or the plurality of channels of the monolithic substrate, refers to an arrangement where the feature is ±5° from the horizontal, preferably ±3° from the horizontal, such as ±0° from the horizontal (i.e. perfectly horizontal within measurement error). The term "substantially horizontally" therefore encompasses the term "horizontally".

The term "substantially parallel" as used herein with reference to two features, such as (i) the end surface of the monolithic substrate in relation to the longitudinal axis of the coating roller or (ii) the longitudinal (i.e. cylindrical) axis of the roller adjacent to the coating roller in relation to the longitudinal (i.e. cylindrical) axis of the coating roller, refers to an arrangement where the features are ±5° from being parallel, preferably ±3° from being parallel, such as ±0° from being parallel (i.e. perfectly parallel within measurement error). The term "substantially parallel" therefore encompasses the term "parallel".

The term "substantially perpendicular" as used herein with reference to two features, such as the plurality of channels of the monolithic substrate in relation to the longitudinal (i.e. cylindrical) axis of the coating roller, refers to an arrangement where the features are ±5° from being perpendicular, preferably ±3° from being perpendicular, such as ±0° from being perpendicular (i.e. perfectly perpendicular within measurement error). The term "substantially perpendicular" therefore encompasses the term "perpendicular".

Example

The invention will now be illustrated by the following non-limiting example.

A liquid for use in the coating process of the invention was prepared as follows. 3330 g of a platinum nitrate solution (15% Pt assay, Johnson Matthey) was added to 4540 g of deionised water. The mixture was kept under moderate shear using a rotor stator mixer. 2100 g of citric acid was added to the Platinum nitrate solution and stirred until dissolved. The solution was then adjusted to higher viscosity adding 32 g of Actigum™ CS-6 Xanthan Gum 25KG CTN (Cargill). The liquid was kept under stir until all the Actigum™ had become dissolved and activated. The resulting solution had a pH of 0.5 and a viscosity of 1400 cP as measured at 10 rpm using a Brookfield™ RVT visoscometer using spindle #03. A trough (as described above) was filled with the resulting liquid and the coating process was carried out using a method of the invention. A 304.8 mm diameter by 152.4 mm high cordierite 62 cells per $cm^2$ (400 cpsi) flow through part was end-coated using the method described. A wet liquid mass of 5.6 g was applied in total to the end of the part after the coating process. The part was then dried using 85° C. forced air through the part and calcined between 500 to 550° C. for 5 minutes.

After calcination, the end coated monolithic substrate was split axially and the coat depth was measured at 3 different points to 0.01 mm accuracy. The coat depth at these 3 points was 0.72 mm, 0.63 mm and 0.81 mm. The average coat depth was therefore 0.72 mm.

For the avoidance of doubt, the entire content of any and all documents cited herein is incorporated by reference into the present application.

The invention claimed is:

1. A method of coating an end surface of a monolithic substrate with a liquid comprising a catalyst component, which method comprises:
   (a) conveying the monolithic substrate to a coating roller;
   (b) applying the liquid onto the end surface of the monolithic substrate by contacting the end surface with the coating roller loaded with the liquid to produce a monolithic substrate having the end surface coated with the liquid, and
   (c) drying the monolithic substrate having the end surface coated with the liquid, and then calcining the monolithic substrate,
   wherein the coating roller has a non-absorbent coater surface.

2. The method according to claim 1, wherein step (a) comprises (a) conveying the monolithic substrate to the coating roller using a conveying device for the monolithic substrate.

3. The method according to claim 1, wherein step (a) comprises (a) conveying the monolithic substrate to the coating roller to bring the end surface of the monolithic substrate into contact with a rotating surface of the coating roller.

4. The method according to claim 1, wherein the coating roller is cylindrical and is rotatable about its longitudinal axis.

5. The method according to claim 4, wherein step (a) comprises (a) conveying the monolithic substrate in an orientation to the coating roller where the end surface of the monolithic substrate is substantially parallel to the longitudinal axis of the coating roller.

6. The method according to claim 4, wherein step (a) comprises (a) conveying the monolithic substrate in an orientation to the coating roller where a plurality of channels of the monolithic substrate are substantially perpendicular to the longitudinal axis of the coating roller.

7. The method according to claim 1, wherein the longitudinal axis of the coating roller is substantially horizontal to the ground.

8. The method according to claim 1, wherein step (b) comprises (b) applying the liquid onto the end surface of the monolithic substrate by contacting the end surface with a rotating surface of the coating roller loaded with the liquid.

9. The method according to claim 1, wherein step (b) comprises (b) applying the liquid onto an end surface of the monolithic substrate by contacting the end surface with the coating roller loaded with the liquid and passing the monolithic substrate over the coating roller.

10. The method according to claim 9, wherein the rotating surface of the coating roller is a non-absorbent surface.

11. The method according to claim 1, wherein the liquid comprises a salt of a platinum group metal or a salt of a transition metal.

12. The method according to claim 1, wherein the liquid is a solution.

13. The method according to claim 1, wherein substantially only the end surface of the monolithic substrate is coated with the liquid.

* * * * *